(12) United States Patent
Kanechika et al.

(10) Patent No.: US 7,553,788 B2
(45) Date of Patent: Jun. 30, 2009

(54) PROCESS FOR PRODUCING AN ALUMINUM NITRIDE SINTERED BODY

(75) Inventors: Yukihiro Kanechika, Shunan (JP); Masanobu Azuma, Shunan (JP)

(73) Assignee: Tokuyama Corporation, Shunan-shi, Yamaguchi (JP)

( * ) Notice: Subject to any disclaimer, the term of this patent is extended or adjusted under 35 U.S.C. 154(b) by 0 days.

(21) Appl. No.: 12/190,787

(22) Filed: Aug. 13, 2008

(65) Prior Publication Data

US 2008/0300128 A1  Dec. 4, 2008

Related U.S. Application Data

(62) Division of application No. 11/527,323, filed on Sep. 26, 2006, now abandoned.

(51) Int. Cl.
*C04B 35/581*  (2006.01)
(52) U.S. Cl. .............. 501/98.5; 264/662; 264/666; 264/673; 264/676
(58) Field of Classification Search ........... 501/98.5; 264/662, 666, 673, 676
See application file for complete search history.

(56) References Cited

U.S. PATENT DOCUMENTS

| 5,063,183 | A | 11/1991 | Taniguchi et al. |
| 5,320,990 | A | 6/1994 | Guiton et al. |
| 5,744,411 | A | 4/1998 | Zhao et al. |
| 7,081,425 | B2 | 7/2006 | Kanechika et al. |
| 7,319,080 | B2 | 1/2008 | Kanechika et al. |

FOREIGN PATENT DOCUMENTS

| JP | 60193254 | A | 10/1985 |
| JP | 63277569 | A | 11/1988 |
| JP | 63277570 | A | 11/1988 |
| JP | 1234371 | A | 9/1989 |
| JP | 2026871 | A | 1/1990 |
| JP | 2275769 | A | 11/1990 |
| JP | 4065367 | A | 3/1992 |
| JP | 4370644 | A | 12/1992 |
| JP | 8091935 | A | 4/1996 |
| JP | 2004315329 | A | 11/2004 |
| JP | 2005119953 | A | 5/2005 |

*Primary Examiner*—Karl E Group
(74) *Attorney, Agent, or Firm*—The Webb Law Firm

(57) ABSTRACT

An aluminum nitride sintered body having resistance to plasma gas and high thermal conduction and having excellent optical properties. The aluminum nitride sintered body of the present invention is characterized in that the proportion of positrons which are annihilated within a period of 180 ps (picoseconds) in the aluminum nitride crystal, as determined in the defect analysis using a positron annihilation method, is not less than 90%, and the sintered body preferably has a thermal conductivity of not less than 200 W/mK.

1 Claim, No Drawings

PROCESS FOR PRODUCING AN ALUMINUM NITRIDE SINTERED BODY

CROSS-REFERENCE TO RELATED APPLICATION

This application is a division of U.S. patent application Ser. No. 11/527,323 filed Sep. 26, 2006, now abandoned, entitled "Aluminum Nitride Sintered Body", which is incorporated by reference herein in its entirety.

BACKGROUND OF THE INVENTION

1. Field of the Invention

The present invention relates to a novel aluminum nitride sintered body. More particularly, the invention relates to an aluminum nitride sintered body which has excellent light transmission properties and can be preferably used particularly as a translucent cover for a light source of high luminous efficiency.

2. Background Art

As light transmitting materials, materials that are transparent to visible light, such as transparent resin, glass, quartz and light transmitting alumina, have been heretofore properly used according to the use environment, cost, etc. For example, as a cover (window material) for a light source of low energy intensity or as a light transmitting material by which light of wavelength rather including no ultraviolet light is transmitted, a transparent resin or a glass is used. As a translucent cover for a light source rather including ultraviolet light or a light source having high energy intensity and thereby having a high temperature when it is used, a material using quartz or alumina is used. As a translucent cover for a light source using a corrosive gas such as a halogen gas, an alumina material having corrosion resistance is used.

Recently, improvement of light sources has been further promoted, and light sources of higher luminous efficiency have been produced. For example, light sources using, as luminescent materials, enclosures containing halides (particularly iodides and bromides) of metals, such as Na, Sc, Sn, Th, Tl, In, Li Tm, Ho and Dy, are known. Enhancement of luminance of light sources, however, increases heat generated, so that in the light sources of high luminous efficiency, materials of light transmitting members such as covers applied to the light sources become problems. That is to say, although the alumina material has resistance to halogen gas, the resistance is still insufficient. Moreover, because of low thermal conductivity of 30 W/mK, heat dissipation of a light source becomes insufficient, and therefore, there is a fear that the life of the light source is shortened. Further, there is another problem of poor color rendering properties because the temperature of an arc tube surface becomes ununiform. Accordingly, a light transmitting member having resistance to halogen gas and high thermal conduction properties is desired.

In order to solve the above problems, aluminum nitride that is excellent in heat resistance, thermal conduction and mechanical strength properties has been proposed as a material of a light transmitting window material that transmits infrared rays or laser beam (see patent document 1). In this publication, it is disclosed that when a powdery raw material having a specific particle diameter of the material powder, a specific content of metallic impurities and a specific content of oxygen is sintered in an inert atmosphere of 1700 to 2100° C., an AlN sintered body showing a transmittance of 75% in the wavelength region of 0.2 μm to 30 μm is obtained.

Further, an arc tube having a translucent cover (hollow tube) composed of an aluminum nitride sintered body which is produced by the use of a raw material aluminum nitride powder having such a particle size distribution that the amount of particles having diameters of 0.3 D to 1.8 D (D: average particle diameter) is not less than 70% is disclosed (see patent document 2). In a working example of this publication, an aluminum nitride sintered body having a total light transmittance of 84% is shown.

According to the techniques described above, it is possible to produce an AlN sintered body improved in the light transmission properties. However, there is yet room for improvement in the light transmittance. That is to say, in the case where an aluminum nitride sintered body is used as a translucent cover, its transmittance in the visible region of 400 nm to 800 nm is desired to exceed 85% taking reflectance into consideration, but the transmittance (400 nm to 800 nm) of an aluminum nitride sintered body obtained by the above-mentioned publicly known techniques is at most 85%. In contrast therewith, the alumina material has a transmittance exceeding 95% though it is inferior to the aluminum nitride sintered body in the resistance to halogen gas and the thermal conductivity. In comparison with the alumina material, therefore, the aluminum nitride sintered body is requested to be further improved in the transmittance.

Moreover, with regard to the light transmission properties in the ultraviolet region, there is yet room for improvement in the build-up properties of light transmittance of the conventional light transmitting aluminum nitride sintered body. When the aluminum nitride sintered body is used as a translucent cover, the build-up properties of light transmittance are important properties to realize high light transmittance in the wide wavelength region of the ultraviolet region to the infrared region.

In a patent document 3, there is disclosed an aluminum nitride sintered body characterized in that the oxygen concentration is held down to not more than 400 ppm, the metallic impurity concentration is held down to not more than 150 ppm, the carbon concentration is held down to not more than 200 ppm, and the sintered body has an average crystal grain diameter of 2 μm to 20 μm. In this sintered body, the inclination of the spectral curve in the wavelength region of 260 to 300 nm is not less than 1.0 (%/nm), the light transmittance in the wavelength region of 400 to 800 nm is not less than 86%, and the wavelength at which 60% of a light transmittance is reached in the spectrum is 400 nm.

Patent document 1: Japanese Patent Laid-Open Publication No. 26871/1990

Patent document 2: Japanese Patent Laid-Open Publication No. 193254/1985

Patent document 3: Japanese Patent Laid-Open Publication No. 119953/2005

DISCLOSURE OF THE INVENTION

However, the light transmittance (total transmittance) of the aluminum nitride sintered body specifically disclosed in a working example of the patent document 3 is at most 87%, and this sintered body has been improved as compared with the conventional aluminum nitride sintered body, but it is inferior to the alumina material that has been already practically used, so that further improvement is desired.

Accordingly, it is an object of the present invention to provide an aluminum nitride sintered body having resistance to plasma gas and high thermal conduction and having excellent optical properties.

It is described in the patent documents 1 and 3 that the content of oxygen and the content of metallic impurities in an aluminum nitride sintered body exert influence on the optical properties. An aluminum nitride sintered body is generally formed from aluminum nitride crystal grains and a grain boundary phase. The grain boundary phase contains, as a main component, a sintering additive such as yttria. The content of oxygen and the content of metallic impurities in the patent documents 1 and 3 are values evaluated based on the whole amount of the sintered body, and therefore, most of the amounts of oxygen and metallic impurities are considered to be attributable to oxygen and metals (yttrium, etc.) present in the grain boundary phase. That is to say, in the inventions of the patent documents 1 and 3, it is designed to improve optical properties by controlling the total composition of the sintered body including the grain boundary phase.

On the other hand, aluminum nitride crystal to constitute the aluminum nitride sintered body that is a polycrystalline body, particularly connection between the crystal and the optical properties, has been hardly studied.

Under such circumstances as mentioned above, the present inventors have studied connection between the characteristics of aluminum nitride crystal to constitute an aluminum nitride sintered body and the optical properties of the sintered body, and as a result, they have found that there is a possibility that defects (e.g., vacancy type defects) in the aluminum nitride crystal exert influence on the optical properties of the sintered body. That is to say, it has been found that with increase of the defects in the crystal, the light transmittance of the sintered body tends to be deteriorated. This suggests that the optical properties of the sintered body can be improved by decreasing the defects of the crystal. Then, the present inventors have invented means to decrease the aluminum vacancy type defects and have accomplished the present invention.

The defects of the aluminum crystal grains are evaluated by a positron annihilation method.

The means to solve the above problems, which are provided by the present invention, are as follows.

(1) An aluminum nitride sintered body obtained from raw materials containing an aluminum nitride powder and a sintering additive of an alkaline earth group based oxide, wherein the proportion of positrons which are annihilated within a period of 180 ps (picoseconds) in the aluminum nitride crystal, as determined in the defect analysis using a positron annihilation method, is not less than 90%.

(2) The aluminum nitride sintered body as stated in (1), which has a thermal conductivity of not less than 200 W/mK.

According to the present invention, an aluminum nitride sintered body having resistance to plasma gas and high thermal conduction properties and having excellent optical properties is provided. Such an aluminum nitride sintered body is promising as, for example, a material of a high-luminance discharge lamp arc tube.

DETAILED DESCRIPTION OF THE INVENTION

The present invention is described in detail hereinafter together with its best mode.

The aluminum nitride sintered body generally comprises aluminum nitride crystal grains and a grain boundary phase containing a sintering additive as a main component. The grain boundary phase, however, is not necessarily essential, and a sintered body having no grain boundary phase and consisting of only aluminum nitride crystal grains is also included in the present invention.

In the aluminum nitride sintered body of the invention, the proportion of positrons which are annihilated within a period of 180 ps (picoseconds) in the aluminum nitride crystal, as determined in the defect analysis using a positron annihilation method, is not less than 90%, preferably not less than 95%, more preferably not less than 98%. The upper limit is theoretically 100%, and according to the present invention, an aluminum nitride sintered body in which 100% of irradiation positrons are annihilated within a period of 180 ps (picoseconds) is provided.

The positron annihilation method is a method wherein radioactive isotope such as $^{22}$Na or $^{58}$Co is used as a positron ray source, and by allowing positrons resulted from $\beta^+$ decay of the radioactive isotope to enter a sample and by measuring a positron life up to the time of pair annihilation mainly with free electrons in the sample, vacancies or defects in the sample are detected. The term "positron life" used herein means a period of time from entering of a positron into the sample to pair annihilation with an electron.

The positron is an anti-particle of an electron, and it has the same mass as that of the electron but has positive electric charge. When the positron enters a sample, it is moderated to about thermal energy in several ps (picoseconds). This is referred to as a "thermalized positron". The thermalized positron undergoes diffusion migration of a distance of about $10^{-7}$m in the crystal, then undergoes pair annihilation with one of electrons in the crystal and simultaneously releases an annihilation γ-ray. By detecting the annihilation γ-ray, the positron life is measured. In case of an aluminum nitride crystal having no vacancy type defect (perfect crystal), the positron life is about 138±10 ps.

By the way, the positron has positive electric charge, so that it repels a positive ion shell (aluminum ion) that constitutes the crystal and tries to go away from it. Therefore, if a defect where the positive ion shell falls off, such as an atomic vacancy, a microvoid (three-dimensional vacancy cluster of about 1 nm) or a void (such a defect being referred to as a "vacancy type defect" hereinafter), is present, the positron having reached the vacancy type defect is trapped there (such positron being referred to as a "trapped positron"). The electron density in the vacancy type defect is lower than that in the perfect crystal, so that the life of the trapped positron becomes longer than the life in the perfect crystal and exceeds usually 150 to 200 ps.

Accordingly, by measuring the positron life, the vacancy type defect of an aluminum nitride crystal that constitutes a sintered body can be evaluated.

In case of the aluminum nitride sintered body of the invention, the proportion of positrons which are annihilated within a period of 180 ps (picoseconds) in the aluminum nitride crystal, as determined in the defect analysis using a positron annihilation method, is not less than 90%, and it can be understood that the aluminum nitride sintered body of the invention is consisting essentially of perfect crystal and has no vacancy type defect substantially.

The aluminum nitride sintered body of the invention has a thermal conductivity of preferably not less than 200 W/mK, more preferably not less than 210 W/mK, particularly preferably not less than 230 W/mK, and also has high thermal conduction properties that are inherently possessed by an aluminum nitride sintered body.

Such an aluminum nitride sintered body of the invention has excellent light transmission properties and has a total transmittance of not less than 70%, preferably 70 to 90%, more preferably 90 to 98%. A method for specifically evaluating the total transmittance is described in detail in the working example.

The aluminum nitride sintered body of the above properties has such optical properties as mentioned above in addition to the high thermal conduction properties and the high resistance to chemical corrosion that are inherently possessed by aluminum nitride. Therefore, also in the case where the aluminum nitride sintered body is applied to an arc tube using a light source of high luminance, lengthening of a life of the light source can be realized.

In the case where the aluminum nitride sintered body is applied to a translucent cover such as an ultraviolet transmitting window, realization of high ultraviolet light transmittance is possible because of the aforesaid optical properties.

Next, a process for producing the aluminum nitride sintered body of the invention is described. The process for producing the aluminum nitride sintered body of the invention is not specifically restricted as long as the aluminum nitride sintered body has the above properties.

The aluminum nitride sintered body of the invention is obtained by, for example, heat-treating an aluminum nitride sintered body, which is obtained by a general sintering method (such a sintered body being sometimes referred to as a "raw material sintered body" hereinafter), in the presence of a high-temperature decomposable aluminum compound.

As the raw material sintered body, an aluminum nitride sintered body wherein the proportion of positrons which are annihilated within a period of 180 ps (picoseconds) in the aluminum nitride crystal, as determined in the defect analysis using a positron annihilation method, is less than 90%, preferably 50 to 90%, is used. That is to say, an aluminum nitride sintered body having relatively few vacancy type defects is preferably used as the raw material sintered body.

As the raw material sintered body, any of various aluminum nitride sintered bodies is employable. One example of processes for producing various sintered bodies is described below, but the process employable is not limited thereto.

The raw material sintered body is produced by molding a mixture of an aluminum nitride powder and a sintering additive into a molded product of a given shape and sintering the molded product in a reducing atmosphere.

As the aluminum nitride powder used as the raw material, a powder having particle diameters capable of attaining crystal grain diameters of 2 to 20 μm by sintering is preferably used. In general, a powder having an average particle diameter that is a little smaller than the above crystal grain diameters is preferably used taking grain growth in the sintering into consideration, and for example, a powder having an average particle diameter of 0.5 to 15 μm, more preferably 1 to 10 μm, is preferable.

In order to hold down the concentration of impurities in the sintered body to a low concentration, the aluminum nitride powder is preferably a high-purity one having a purity of not less than 97% by weight, desirably not less than 99% by weight, and most preferably used is high-purity aluminum nitride wherein the metallic impurity concentration (concentration of metals other than Al) is not more than 50 ppm and the oxygen concentration has been reduced to not more than 1% by weight, particularly not more than 0.8% by weight.

Further, in order to reduce the concentration of oxygen in the sintered body, which is a main cause of a vacancy type lattice defect, an aluminum nitride powder containing carbon as an impurity component is also employable. That is to say, by carrying out sintering in the presence of carbon, oxygen contained as an impurity reacts with the carbon and is removed as a carbon dioxide gas. However, if such carbon is contained in a large amount in the raw material powder, it remains as an impurity in the sintered body and is liable to deteriorate light transmission properties, so that the concentration of carbon in the aluminum nitride powder is preferably not more than 450 ppm.

As the sintering additive, a publicly known one, for example, an alkaline earth group based oxide, such as CaO, SrO or $Ca_3Al_2O_6$, is employed. Further, a rare earth group based oxide, such as $Y_2O_3$, $CeO_2$, $Ho_2O_3$, $Yb_2O_3$, $Gd_2O_3$, $Nb_2O_3$, $Sm_2O_3$ or $Dy_2O_3$, is also employable. However, it is preferable to use the rare earth group based oxide in such a manner that the content of rare earth elements in the aluminum nitride sintered body finally obtained becomes less than 0.01 ppm, and it is more preferable to use it in such a manner that any rare earth element is not contained at all. The sintering additive does not necessarily have to be an oxide, and it may be, for example, a carbonate, a nitrate or a phosphate. The amount of the sintering additive added is preferably in the range of 2 parts by weight to 20 parts by weight based on 100 parts by weight of the aluminum nitride powder. If the amount thereof is smaller than 2 parts by weight, high purity of the aluminum nitride sintered body cannot be realized, and properties such as light transmittance and thermal conductivity are lowered. Also in the case where the amount of the sintering additive exceeds 20 parts by weight, the sintering additive added cannot volatilize efficiently, and properties such as light transmittance and thermal conductivity are lowered.

Mixing of the aluminum nitride powder with the sintering additive powder can be carried out by a publicly known method. For example, mixing by a dry process or a wet process using a mixing machine such as a ball mill is preferably adoptable. In the wet mixing method, dispersion media such as alcohols and hydrocarbons are used. From the viewpoint of dispersibility, it is preferable to use alcohols or hydrocarbons.

For the mixing, the sintering additive is preferably stored in dry air so as not to undergo water absorption or aggregation and if necessary vacuum dried, and it is preferable to immediately mix a powder of the sintering additive with the aluminum nitride powder.

Prior to sintering, the mixed powder is molded into a molded product of a given shape according to the use purpose, and molding can be carried out by a publicly known method. In order to mold the powder into a molded product of high strength and in order to enhance yields, molding is preferably carried out using an organic binder.

For example, the mixed powder is mixed with an organic binder and if necessary with a dispersant, a plasticizer, a solvent, etc. to prepare a molding slurry or paste. This molding slurry or paste is molded by a molding method, such as a doctor blade method, an extrusion molding method, an injection molding method or a cast molding method, whereby a molded product can be produced. Examples of the organic binders include butyral resins such as polyvinyl butyral and acrylic resins such as polybutylmethacrylate. Such an organic binder can be used in an amount of 0.1 to 30 parts by weight, particularly 1 to 15 parts by weight, based on 100 parts by weight of the aluminum nitride powder. Examples of the dispersants include glycerol compounds. Examples of the plasticizers include phthalic esters. Examples of the solvents include isopropyl alcohol and hydrocarbons.

It is also possible to carry out molding by a compression molding method without using an organic binder. For example, from a mixed power of the aluminum nitride powder and the sintering additive powder, a temporary molded product is produced by the use of a monoaxial molding machine, and the temporary molded product is pressured-molded at 1 to 4 $t/cm^2$ by the use of a CIP (cold isotactic press) molding machine, whereby a molded product can be produced.

The resulting molded product is degreased (removal of binder) and then sintered.

Although the degreasing can be carried out by heating the molded product in an arbitrary atmosphere such as air, nitrogen or hydrogen, it is preferable to carry out degreasing in nitrogen in which control of the amount of residual carbon is easily made. The degreasing temperature is in the range of generally 300 to 900° C., particularly preferably 300 to 700° C. In the case where molding is carried out without using an organic binder as in the compression molding method, this degreasing step is unnecessary.

In order to efficiently carry out removal of the sintering additive to reduce the concentration of metallic impurities and the concentration of oxygen in the sintered body, sintering is carried out in a reducing atmosphere.

For realizing the reducing atmosphere, a method of allowing a carbon generation source to be present together with the molded product in a container for sintering, a method of using a container made of carbon as a container for sintering, etc. are employable. Of these, the method of allowing a carbon generation source to be present together with the molded product in a container for sintering is preferable taking thermal conductivity and color ununiformity of the resulting sintered body into consideration. In order to particularly obtain high thermal conductivity, a method wherein a closed container is used as the container for sintering and the molded product and the carbon generation source are placed in this closed container is most preferable.

The carbon generation source is not specifically restricted, and carbon in a publicly known state, such as amorphous carbon or graphite, is employable. Preferable is solid carbon. The form of the carbon is not specifically restricted, and any form of a powder, a fiber, a felt, a sheet and a plate is employable. A combination of those forms is also employable. Of these, amorphous carbon or graphite in a plate form is preferable taking acquisition of high thermal conductivity into consideration.

The method of placing the molded product and carbon in a container is not specifically restricted, and the carbon and the molded product may be placed in any of a non-contact state and a contact state. Of these, the non-contact state is preferable from the viewpoint of easy control of thermal conductivity of the resulting sintered body. As the non-contact state, a publicly known non-contact state is adoptable, and for example, a method of simply providing a space between carbon and the molded product, a method of interposing a powder of boron nitride or the like between carbon and the molded product to make them be in the non-contact state, or a method of placing a plate or the like made of ceramic such as aluminum nitride or boron nitride between carbon and the molded product to make them be in the non-contact state is employable. Taking improvement of thermal conductivity into consideration, the method of placing a plate or the like between carbon and the molded product to make them be in the non-contact state is preferable, and in order to obtain a raw material sintered body having much higher thermal conductivity, a method of placing a plate so as to isolate a space where carbon is placed as much as possible from a space where the molded product is placed in a closed container is particularly preferable.

The sintering in a reducing atmosphere is preferably carried out at a temperature of 1500 to 2000° C. for at least 3 hours, particularly at least 10 hours. If the sintering is carried out for a long period of time, growth of crystal grains of the aluminum nitride sintered body is brought about, and besides, the concentration of carbon in the sintered body is increased, so that the time of sintering in a reducing atmosphere is preferably not more than 200 hours, particularly preferably not more than 100 hours, most preferably not more than 50 hours.

In order to surely decrease the carbon concentration in the sintered body to be within the aforesaid range, it is preferable to carry out sintering in a neutral atmosphere in combination with the aforesaid sintering in a reducing atmosphere. For example, an embodiment wherein after sintering in a neutral atmosphere, sintering in a reducing atmosphere is carried out, or an embodiment wherein after sintering in a neutral atmosphere, sintering in a reducing atmosphere is carried out and then sintering in a neutral atmosphere is further carried out is preferably adopted. The reason is that if sintering in a reducing atmosphere is carried out for a long period of time, the carbon concentration is increased even if the metallic impurity concentration is held down to be within the aforesaid range, and the optical properties of the sintered body are eventually deteriorated. Therefore, by limiting the time of sintering in a reducing atmosphere to the aforesaid range and by properly carrying out sintering in a neutral atmosphere, a dense and highly strong sintered body can be obtained.

The "neutral atmosphere" means an atmosphere wherein oxygen "$O_2$" and carbon "C" are not substantially present, and more specifically, it means an atmosphere of an inert gas such as nitrogen or argon. Sintering in a neutral atmosphere is carried out by, for example, purging a closed container with an inert gas. As the closed container, a container made of ceramic, such as aluminum nitride or boron nitride, or a non-carbon material, such as tungsten "W" or molybdenum "Mo", is employed, and from the viewpoint of durability, a container made of ceramic such as aluminum nitride or boron nitride is preferable. Further, a container made of carbon whose inner surface has been coated with a material that is the aforesaid non-carbon material and is impermeable to gasses is also employable. In short, sintering has only to be carried out in such a state that a carbon source other than the residual carbon in the molded product is not allowed to be present in the space of the closed container.

The temperature of sintering in such a neutral atmosphere as above is preferably in the range of 1500 to 1900° C., and the sintering time is in the range of usually 3 to 100 hours, preferably 30 to 50 hours, though it varies depending upon the time of sintering in a reducing atmosphere Subsequently, the resulting raw material sintered body is heat-treated in the presence of a high-temperature decomposable aluminum compound, whereby an aluminum nitride sintered body of the invention is obtained. The high-temperature decomposable aluminum compound is preferably a material which is stably present in the intermediate stage of sintering of aluminum nitride and further also in the latter stage thereof and liberates an aluminum based gas into a gas phase. That is to say, a material which is stably present at a temperature of not lower than 1000° C. and liberates an aluminum based gas is preferable. For example, $Al_2O_3$, $Al_2S_3$, $AlF_3$ or AlN is employable. Differently from the raw material sintered body, aluminum nitride used as the high-temperature decomposable aluminum compound slowly liberates an aluminum based gas at a temperature of about (1500)° C. The properties of slow gas liberation of the high-temperature decomposable aluminum nitride are thought to be attributable to composition or structure of the boundary grain phase. The high-temperature decomposable aluminum compound may be in any form, such as a powder, a molded product or a sintered body, and the same effect is obtained also by exposing a gasified aluminum based compound to the raw material sintered body. In the annealing step, a $N_2$ gas is allowed to flow under the conditions of 0.1 to 30 liters/min. The annealing is carried out by allowing the high-temperature decomposable aluminum compound to co-exist in a sintering container made of a material such as dense carbon, boron nitride or aluminum nitride at an annealing temperature of 1600 to 2000° C. for 1 to 200 hours.

Without wishing to be bound by theory, it is considered that by virtue of such a heat treatment as mentioned above, the vacancy type defects in the raw material sintered body are complimented by aluminum to form aluminum nitride crystal grains of perfect crystal or close thereto, whereby optical properties such as light transmission properties are improved.

Since the aluminum nitride sintered body obtained as above imparts sufficient strength to a device, so that it is used in various forms, such as tubular form, plate form, curved surface form, spherical form, elliptic spherical form, cup form and bowl form, according to the structure of use purpose such as a translucent cover.

Industrial Applicability

The aluminum nitride sintered body of the invention has excellent optical properties such as light transmission properties in addition to the high thermal conduction properties and the high resistance to chemical corrosion which are inherently possessed by aluminum nitride. Therefore, the sintered body can be used as a material of an arc tube of a high-luminance light source and can realize lengthening of a life of the light source.

EXAMPLES

The present invention is further described with reference to the following examples, but it should be construed that the invention is in no way limited to those examples.

In the examples and the comparative examples, various properties were measured in the following manner.

(1) Life of Positron

As a positron generation source, $^{22}$Na was used. By $\beta^+$ decay of $^{22}$Na, a γ ray ($\gamma_0$) of 1275 keV was released together with positrons. The time at which the positrons were generated was confirmed by detecting $\gamma_0$ by means of a scintillator. Then, aluminum nitride was irradiated with the positrons of at most 540 keV thus generated. In the aluminum nitride, the positrons were moderated to about thermal energy and then underwent pair annihilation with electrons to release 2 annihilation γ rays ($\gamma_1$) of 511 keV. The $\gamma_1$ released from the aluminum nitride was detected to determine the time at which the positrons were annihilated. By measuring the time difference using a time-measuring circuit, a positron life spectrum was obtained.

In case of an aluminum nitride crystal having no vacancy type defect (perfect crystal), the positron life is about 138±10 ps. In the irradiation of the aluminum nitride sintered body with the positrons, the proportion of positrons annihilated within a period of 180 ps (picoseconds) was determined.

(2) Thermal Conductivity

Thermal conductivity was measured by a laser flash method using a thermal constants measuring device PS-7 manufactured by Rigaku Denki Co., Ltd. Correction of thickness was carried out by the use of a calibration curve.

(3) Light Transmittance

In the measurement of a light transmittance of an aluminum nitride sintered body, the aluminum nitride sintered body was processed into a shape having a diameter of 30 mm and a thickness of 0.3 mm, and its light transmittance was measured by the use of "HZ-1" manufactured by Suga Test Instrument Co., Ltd.

(4) Spectrum

In the measurement of a spectrum of an aluminum nitride sintered body in the wavelength region of 240 to 800 nm, the aluminum nitride sintered body was processed into a shape having a diameter of 30 mm, a thickness of 0.3 mm and an average surface roughness Ra (JIS B 0601) of not more than 0.05 pm, and its spectrum was measured by the use of "UV-2100" manufactured by Shimadzu Corporation. From the spectral curve, an inclination (build-up properties) in the wavelength region of 260 to 300 nm and a wavelength at which 60% of a light transmittance was reached were determined.

Example 1

In a nylon pot having an internal volume of 2.4 liters, nylon balls whose iron cores had been coated with nylon and each of which had a diameter of 15 mm (surface hardness: not more than 100 kgf/mm$^2$, density: 3.5 g/cm$^3$) were placed, then 100 parts by weight of an aluminum nitride powder having an average particle diameter of 1.3 μm, a specific surface area of 3.39 m$^2$/g, an oxygen concentration of 0.8 wt % and a metallic element concentration of 35 ppm, 2 parts of a calcium aluminate compound ($Ca_3Al_2O_6$) having an average particle diameter of 1.8 μm and a specific surface area of 3.75 m$^2$/g as a sintering additive powder and 40 parts by weight of ethanol as a solvent were added, and they were mixed by a wet process. In this mixing operation, the nylon balls occupied 40% (apparent volume) of the internal volume of the pot. The mixing was carried out for 3 hours by rotating the pot at a rotational speed of 70 rpm. The resulting slurry was dried to obtain an aluminum nitride powder.

Subsequently, 10 g of the resulting aluminum nitride powder was subjected to temporary molding by the use of a monoaxial molding machine to prepare a molded product having a diameter of 40 mm and a thickness of 6 mm. Thereafter, the molded product was subjected to main molding by the use of a CIP molding machine under application of a load of 3 t/cm$^2$.

The molded product obtained through the above operations was sintered at a sintering temperature of 1880° C. for 30 hours in a gas atmosphere containing nitrogen and a reducing substance by the use of an aluminum nitride setter to obtain a sintered body having a diameter of 30 mm and a thickness of 5 mm. The resulting sintered body was placed in an aluminum nitride setter containing 3 g of an alumina powder as a high-temperature decomposable aluminum compound, and then annealing was carried out at a temperature of 1880° C. for 30 hours to obtain an aluminum nitride sintered body. The conditions for producing the aluminum nitride sintered body and the properties of the resulting aluminum nitride sintered body are set forth in Table 1.

Example 2

The same procedure as in Example 1 was repeated except that the amount of the sintering additive was changed to 3 parts. The conditions for producing the aluminum nitride sintered body and the properties of the resulting aluminum nitride sintered body are set forth in Table 1.

Example 3

The same procedure as in Example 1 was repeated except that the amount of the sintering additive was changed to 5 parts. The conditions for producing the aluminum nitride sintered body and the properties of the resulting aluminum nitride sintered body are set forth in Table 1.

Example 4

The same procedure as in Example 1 was repeated except that the amount of the sintering additive was changed to 7 parts. The conditions for producing the aluminum nitride sintered body and the properties of the resulting aluminum nitride sintered body are set forth in Table 1.

Example 5

The same procedure as in Example 1 was repeated except that the amount of the sintering additive was changed to 10 parts. The conditions for producing the aluminum nitride sintered body and the properties of the resulting aluminum nitride sintered body are set forth in Table 1.

Example 6

The same procedure as in Example 1 was repeated except that the amount of the sintering additive was changed to 5 parts and the type of the high-temperature decomposable aluminum compound in the annealing treatment was changed to aluminum sulfide. The conditions for producing the aluminum nitride sintered body and the properties of the resulting aluminum nitride sintered body are set forth in Table 1.

Example 7

The same procedure as in Example 1 was repeated except that the amount of the sintering additive was changed to 5 parts and the type of the high-temperature decomposable aluminum compound in the annealing treatment was changed to aluminum fluoride. The conditions for producing the aluminum nitride sintered body and the properties of the resulting aluminum nitride sintered body are set forth in Table 1.

Example 8

The same procedure as in Example 1 was repeated except that the amount of the sintering additive was changed to 5 parts and the type of the high-temperature decomposable aluminum compound in the annealing treatment was changed to AlN. The high-temperature decomposable aluminum compound used in the annealing treatment was SH30 (aluminum nitride sintered body available from Tokuyama Corporation). The conditions for producing the aluminum nitride sintered body and the properties of the resulting aluminum nitride sintered body are set forth in Table 1.

Comparative Example 1

The same procedure as in Example 1 was repeated except that the sintering additive was not added. The conditions for producing the aluminum nitride sintered body and the properties of the resulting aluminum nitride sintered body are set forth in Table 1.

Comparative Example 2

The same procedure as in Example 1 was repeated except that the amount of the sintering additive was changed to 0.5 part. The conditions for producing the aluminum nitride sintered body and the properties of the resulting aluminum nitride sintered body are set forth in Table 1.

Comparative Example 3

The same procedure as in Example 1 was repeated except that the amount of the sintering additive was changed to 1 part. The conditions for producing the aluminum nitride sintered body and the properties of the resulting aluminum nitride sintered body are set forth in Table 1.

Comparative Example 4

The same procedure as in Example 1 was repeated except that the amount of the sintering additive was changed to 5 parts and the annealing treatment was not carried out. The conditions for producing the aluminum nitride sintered body and the properties of the resulting aluminum nitride sintered body are set forth in Table 1.

Comparative Example 5

The same procedure as in Example 1 was repeated except that as the sintering additive, $Y_2O_3$ was added in an amount of 5 parts, sintering was carried out at a sintering temperature of 1780° C. for a retention time of 5 hours in a neutral atmosphere, and the annealing treatment was not carried out. The conditions for producing the aluminum nitride sintered body and the properties of the resulting aluminum nitride sintered body are set forth in Table 1.

Comparative Example 6

The same procedure as in Example 1 was repeated except that the sintering additive was not added, sintering was carried out at a sintering temperature of 1880° C. for a retention time of 5 hours in a neutral atmosphere, and the annealing treatment was not carried out. The conditions for producing the aluminum nitride sintered body and the properties of the resulting aluminum nitride sintered body are set forth in Table 1.

TABLE 1

|  | | Production process Sintering additive | | | Sintering | | |
| --- | --- | --- | --- | --- | --- | --- | --- |
|  | No. | Type | Amount (part(s)) | Molding | Temperature (° C.) | Time (hours) | Atmosphere |
| Example | 1 | C3A | 2 | CIP | 1880 | 30 | reducing $N_2$ |
|  | 2 | C3A | 3 | CIP | 1880 | 30 | reducing $N_2$ |
|  | 3 | C3A | 5 | CIP | 1880 | 30 | reducing $N_2$ |
|  | 4 | C3A | 7 | CIP | 1880 | 30 | reducing $N_2$ |
|  | 5 | C3A | 10 | CIP | 1880 | 30 | reducing $N_2$ |

TABLE 1-continued

|  | | No. | Type | Amount (part(s)) | Molding | Temperature (°C.) | Time (hours) | Atmosphere |
|---|---|---|---|---|---|---|---|---|
|  | | 6 | C3A | 5 | CIP | 1880 | 30 | reducing $N_2$ |
|  | | 7 | C3A | 5 | CIP | 1880 | 30 | reducing $N_2$ |
|  | | 8 | C3A | 5 | CIP | 1880 | 30 | reducing $N_2$ |

|  | | | Annealing | | |
|---|---|---|---|---|---|
|  | No. | Temperature (°C.) | Time (hours) | Additive |
| Example | 1 | 1880 | 30 | $Al_2O_3$ |
|  | 2 | 1880 | 30 | $Al_2O_3$ |
|  | 3 | 1880 | 30 | $Al_2O_3$ |
|  | 4 | 1880 | 30 | $Al_2O_3$ |
|  | 5 | 1880 | 30 | $Al_2O_3$ |
|  | 6 | 1880 | 30 | $Al_2S_3$ |
|  | 7 | 1880 | 30 | $AlF_3$ |
|  | 8 | 1880 | 30 | AlN |

|  | | | Properties | | |
|---|---|---|---|---|---|
|  | No. | Proportion of annihilated positrons (%) | Thermal conductivity (W/mK) | Total transmittance (%) | Build-up properties of spectrum |
| Example | 1 | 97 | 202 | 86.0 | 1.30 |
|  | 2 | 100 | 216 | 86.2 | 1.35 |
|  | 3 | 100 | 211 | 86.3 | 1.37 |
|  | 4 | 100 | 216 | 86.4 | 1.39 |
|  | 5 | 100 | 234 | 86.5 | 1.39 |
|  | 6 | 100 | 205 | 86.5 | 1.33 |
|  | 7 | 100 | 210 | 86.7 | 1.32 |
|  | 8 | 100 | 207 | 86.6 | 1.39 |

|  | | Production process Sintering additive | | | Sintering | | |
|---|---|---|---|---|---|---|---|
|  | No. | Type | Amount (part(s)) | Molding | Temperature (°C.) | Time (hours) | Atmosphere |
| Comparative Example | 1 | none | 0 |  | 1880 | 30 | reducing $N_2$ |
|  | 2 | C3A | 0.5 |  | 1880 | 30 | reducing $N_2$ |
|  | 3 | C3A | 1 |  | 1880 | 30 | reducing $N_2$ |
|  | 4 | C3A | 5 | CIP | 1880 | 30 | reducing $N_2$ |
|  | 5 | $Y_2O_3$ | 5 |  | 1780 | 5 | neutral $N_2$ |
|  | 6 | none | 0 | CIP | 1880 | 5 | neutral $N_2$ |

|  | | | Annealing | | |
|---|---|---|---|---|---|
|  | No. | Temperature (°C.) | Time (hours) | Additive |
| Comparative Example | 1 | 1880 | 30 | $Al_2O_3$ |
|  | 2 | 1880 | 30 | $Al_2O_3$ |
|  | 3 | 1880 | 30 | $Al_2O_3$ |
|  | 4 |  |  |  |
|  | 5 |  |  |  |
|  | 6 |  |  |  |

|  | | | Properties | | |
|---|---|---|---|---|---|
|  | No. | Proportion of annihilated positrons (%) | Thermal conductivity (W/mK) | Total transmittance (%) | Build-up properties of spectrum |
| Comparative Example | 1 | 58 | 102 | 36.0 | 0.25 |
|  | 2 | 74 | 150 | 78.0 | 0.70 |
|  | 3 | 82 | 176 | 79.0 | 0.95 |
|  | 4 | 88 | 190 | 83.0 | 0.98 |
|  | 5 | 80 | 173 | 43.0 | 0.50 |
|  | 6 | 50 | 80 | 33.0 | 0.20 |

C3A = $Ca_3Al_2O_6$
CIP = Cold Isostatic Press

The invention claimed is:

1. A process for producing an aluminum nitride sintered body, comprising the steps of:

molding a mixture comprising 100 parts by weight of an aluminum nitride powder and between 2 parts by weight and 20 parts by weight of a sintering additive of an alkaline earth group based oxide to create a molded product;

sintering the molded product at a temperature of between 1500 and 2000° C. for between 3 and 200 hours in a reducing atmosphere in order to obtain a raw material sintered body; and annealing the raw material sintered body at a temperature of between 1600 and 2000° C. for between 1 and 200 hours in the presence of an aluminum compound which is stably present at a temperature of not lower than 1000° C. and liberates an aluminum based gas.

* * * * *